US008994789B2

(12) United States Patent
Paczkowski et al.

(10) Patent No.: US 8,994,789 B2
(45) Date of Patent: Mar. 31, 2015

(54) DIGITAL VIDEO SIGNAL, A METHOD FOR ENCODING OF A DIGITAL VIDEO SIGNAL AND A DIGITAL VIDEO SIGNAL ENCODER (75) Inventors: Jacek Paczkowski, Siemianowice Slaskie (PL); Pawel Blonski, Zielona Gora (PL)

(73) Assignee: Advanced Digital Broadcast S.A., Chambesy (CH)

( * ) Notice: Subject to any disclaimer, the term of this patent is extended or adjusted under 35 U.S.C. 154(b) by 485 days.

(21) Appl. No.: 13/520,561

(22) PCT Filed: Jan. 21, 2011

(86) PCT No.: PCT/EP2011/050845
§ 371 (c)(1),
(2), (4) Date: Jul. 4, 2012

(87) PCT Pub. No.: WO2011/089229
PCT Pub. Date: Jul. 28, 2011

(65) Prior Publication Data
US 2012/0300030 A1 Nov. 29, 2012

(30) Foreign Application Priority Data

Jan. 22, 2010 (EP) ..................................... 10151391

(51) Int. Cl.
H04N 13/00 (2006.01)
G09G 3/00 (2006.01)
H04N 19/503 (2014.01)
H04N 19/70 (2014.01)
H04N 19/132 (2014.01)
H04N 19/182 (2014.01)
H04N 7/26 (2006.01)

(52) U.S. Cl.
CPC ............ *G09G 3/003* (2013.01); *G09G 2310/04* (2013.01); *G09G 2340/16* (2013.01); *H04N 19/503* (2014.11); *H04N 19/70* (2014.11); *H04N 19/132* (2014.11); *H04N 19/182* (2014.11)

USPC .............................................. 348/43; 375/240

(58) Field of Classification Search
CPC . H04N 7/50; H04N 7/26271; H04N 7/26244; H04N 9/8042; H04N 5/85
USPC ............................................................. 348/43
See application file for complete search history.

(56) References Cited

U.S. PATENT DOCUMENTS

2004/0218670 A1* 11/2004 Lai et al. ................... 375/240.01
2008/0107349 A1* 5/2008 Sung et al. ..................... 382/245

(Continued)

OTHER PUBLICATIONS

Weigand, T et al., "Overview of the H.264/AVC Video Coding Standard", IEEE Transaction on Circuits and System for Video Technology, IEEE Service Center, Piscataway, NJ, US LNKD-DOI: 10.1109/TCSVT.2003.815165, vol. 13, No. 7, Jul. 1, 2001, pp. 560-576.

*Primary Examiner* — Sath V Perungavoor
*Assistant Examiner* — Howard D Brown, Jr.
(74) *Attorney, Agent, or Firm* — Mark M Friedman (57) ABSTRACT One object of the invention is a digital video signal comprising a sequence of frames, wherein each video frame in the sequence differs with respect to the previous frame in the sequence by a number of pixels which is not higher than a predetermined pixels maximum threshold amount. Another object of the invention is a method for encoding of a digital source video signal, comprising the steps of receiving a reference frame, receiving a source frame of the source video signal, generating an encoded frame based on the differences between the source frame and the reference frame, wherein the generating of the encoded frame comprises the steps of determining a pixels maximum threshold amount, comparing the reference frame with the source frame and selecting a number of pixels from the pixels which differ between the reference frame and the source frame, the number of selected pixels being not higher than the pixels maximum threshold amount, changing the values of the selected pixels of the reference frame to the values of corresponding pixels of the source frame to provide a reference frame for the next source frame and providing an encoded frame defining pixels changed in the reference frame.

10 Claims, 4 Drawing Sheets

(56) References Cited

U.S. PATENT DOCUMENTS

| | | | |
|---|---|---|---|
| 2009/0273717 A1* | 11/2009 | Masaoka et al. | 348/620 |
| 2011/0007968 A1* | 1/2011 | Yamada | 382/165 |
| 2011/0274170 A1* | 11/2011 | Paz | 375/240.13 |
| 2012/0033138 A1* | 2/2012 | Li et al. | 348/700 |
| 2012/0155533 A1* | 6/2012 | Puri et al. | 375/240.02 |
| 2013/0287109 A1* | 10/2013 | Wang et al. | 375/240.16 |

* cited by examiner

DIGITAL VIDEO SIGNAL, A METHOD FOR ENCODING OF A DIGITAL VIDEO SIGNAL AND A DIGITAL VIDEO SIGNAL ENCODER

TECHNICAL FIELD

The present invention relates to video signal coding, including transcoding.

BACKGROUND ART

A typical video signal comprises a number of frames, which when displayed at an appropriate speed, such as 25 frames per second, provide a viewer with an impression of viewing a continuous scene. A digital signal contains, in its raw form, a sequence of frames to be displayed. A number of techniques are known for encoding the raw digital signal, wherein most of the techniques are directed to decreasing the bandwidth necessary to transmit the signal while maintaining an acceptable quality level for given audience. When the encoded digital video signal is to be displayed, it is decoded into its raw form and consecutive frames are transmitted to the display in order to present them to the viewer at a given speed.

A stereoscopic video signal comprises alternate left and right frames, i.e. frames to be viewed by the left eye and the right eye of the viewer, to be displayed at a higher speed than a mono video signal, such as 60 frames per second. The signal may be viewed by so-called shutter glasses, such as LCD shutter glasses, the operation of which is synchronized with the display. When the left frame is displayed, the left shutter glass is open and the right shutter glass is closed, while when the right frame is displayed, the left shutter glass is closed and the right shutter glass is open. A basic stereoscopic system of this type is disclosed in the U.S. Pat. No. 4,424,529 "Remotely triggered portable stereoscopic viewer system".

A typical video display, such as an LCD display, needs some amount of time, typically in the order of 5 ms to 8 ms, to redraw the currently displayed frame to display a next frame, called a frame redraw time. It is important to synchronize the operation of shutter glasses such that a shutter glass is open only when the frame is completely redrawn, so as to provide the viewer with a complete picture. Therefore, during redrawing of a frame, the left shutter glass and the right shutter glass are both closed. When the frames are displayed at a rate of 60 frames per second, the time allotted for a single frame for one of the eyes is 16.7 ms, wherein the frame is displayed for example for 11.7 ms and redrawn for 5 ms. In an ideal situation, when the shutter glasses are perfectly synchronized with the display, the active viewing coefficient, defining the percentage of time at which one eye of the viewer may watch the video signal, is 11.7 ms/2*16.7 ms=35%. The coefficient can be much worse for older types of displays having longer redraw time, such as 20% for a 10 ms redraw time. In practice, there may be an additional shutters closing time necessary to be introduced in order to compensate for various signal delays. Various attempts have been made to improve the synchronization, in order to arrive at a high active viewing coefficient while keeping proper synchronization, such as the method disclosed in the U.S. Pat. No. 6,678,091 "System and method to synchronize one or more shutters with a sequence of images".

The lower the active viewing coefficient, the less information is received by the viewer's eyes and the worse impression of the viewed signal, due to worse brightness and color perception. The aim of the present invention is to improve the viewer impression when viewing a video signal, in particular a stereoscopic video signal. This aim is achieved by providing a video signal which can be displayed with a shorter frame redraw time. In case of mono video signals, this results in a more stable display. In case of stereoscopic video signals, this allows achieving higher active viewing coefficient when viewing the signal via shutter glasses.

DISCLOSURE OF THE INVENTION

One object of the invention is a digital video signal comprising a sequence of frames, characterized in that each video frame in the sequence differs with respect to its previous frame in the sequence by a number of pixels which is not higher than a predetermined pixels maximum threshold amount.

The signal may comprise at least one difference frame, the difference frame defining changed pixels only. The signal may also comprise at least one full frame, the full frame defining pixels changed and pixels unchanged with respect to the previous frame in the sequence.

The number of pixels changed may be equal to the predetermined pixels maximum threshold amount or not less than a predetermined pixels minimum threshold amount.

The changed pixels can be the pixels whose value differs most between a source frame and a reference frame of a pre-encoded signal. The changed pixels can be also pixels belonging to a predetermined one or more frame regions.

Another object of the invention is a method for encoding of a digital source video signal, comprising the steps of receiving a reference frame, receiving a source frame of the source video signal, generating an encoded frame based on the differences between the source frame and the reference frame, wherein the generating of the encoded frame comprises the steps of determining a pixels maximum threshold amount, comparing the reference frame with the source frame and selecting a number of pixels from the pixels which differ between the reference frame and the source frame, the number of selected pixels being not higher than the pixels maximum threshold amount, changing the values of the selected pixels of the reference frame to the values of corresponding pixels of the source frame to provide a reference frame for the next source frame and providing an encoded frame defining pixels changed in the reference frame.

The encoded frame may further define pixels unchanged in the reference frame.

The method may further comprise the step of, in case the number of selected pixels is lower than the pixels maximum threshold amount, selecting further pixels and changing the values of the selected further pixels of the reference frame such that the sum of the number of selected pixels and selected further pixels is equal to the pixels maximum threshold amount or not less than a predetermined pixels minimum threshold amount.

The selected pixels can be the pixels whose value differs most between the source frame and the reference frame. The selected pixels can be also pixels belonging to a predetermined one or more frame regions.

The method may further comprise the steps of receiving at least one further source frame, comparing the reference frame with the source frame and the at least one further source frame and selecting a number of pixels from the pixels which differ between the reference frame and the source frame and/or the at least one further source frame.

The method may further comprise the step of determining the value of the pixels maximum threshold amount depending on the source signal contents.

The method may further comprise the step determining the value of the pixels maximum threshold amount depending on the amount of differences between the encoded frames and the source frames.

Another object of the invention is a computer program comprising program code means for performing all the steps of the above method when said program is run on a computer.

A still further object of the invention is a computer readable medium storing computer-executable instructions performing all the steps of the above computer-implemented method when executed on a computer.

Another object of the invention is a digital video signal encoder comprising a reference frame buffer configured to receive a reference frame, a source frame buffer configured to receive a source frame of a source video signal, a frame encoder configured to generate an encoded frame based on the differences between the source frame and the reference frame, wherein the frame encoder comprises a pixels maximum threshold amount container, a frame processor coupled to the pixels maximum threshold amount container and configured to receive a reference frame from the reference frame buffer, receive a source frame from the source frame buffer, compare the reference frame with the source frame and select a number of pixels from the pixels which differ between the reference frame and the source frame, the number of selected pixels being not higher than the pixels maximum threshold amount, change the values of the selected pixels of the reference frame to the values of the corresponding pixels of the source frame to provide a reference frame for the next source frame and store the reference frame in the reference frame buffer and provide an encoded frame defining pixels changed in the reference frame.

The frame processor may be further configured to provide an encoded frame defining pixels changed in the reference frame and pixels unchanged in the reference frame.

The frame processor may be further configured to, in case the number of selected pixels is lower than the pixels maximum threshold amount, select further pixels and change the values of the selected further pixels of the reference frame such that the sum of the number of selected pixels and selected further pixels is equal to the pixels maximum threshold amount or not less than a predetermined pixels minimum threshold amount.

The frame processor may be further configured select pixels whose value differs most between the source frame and the reference frame. The frame processor may be also configured to select pixels belonging to a predetermined one or more frame regions.

The frame processor may be further configured to receive at least one further source frame from the source frame buffer configured to store a plurality of consecutive source frames, compare the reference frame with the source frame and the at least one further source frame and select a number of pixels from the pixels which differ between the reference frame and the source frame and/or the at least one further source frame.

The digital video signal encoder may further comprise a signal quality analyzer configured to receive source frames from the source frame buffer and to determine the value of the pixels maximum threshold amount depending on the source signal contents and to set the determined value at the pixels maximum threshold amount container.

The digital video signal encoder may further comprise a signal quality analyzer configured to receive source frames from the source frame buffer and to receive reference frames from the reference frame buffer and to determine the value of the pixels maximum threshold amount depending on the amount of differences between the encoded frames and the source frames and to set the determined value at the pixels maximum threshold amount container.

A further object of the invention is also a video display unit comprising the above digital video signal encoder.

BRIEF DESCRIPTION OF DRAWINGS

The invention will be described with reference to a drawing, in which.

MODES FOR CARRYING OUT THE INVENTION

Figure 1A:
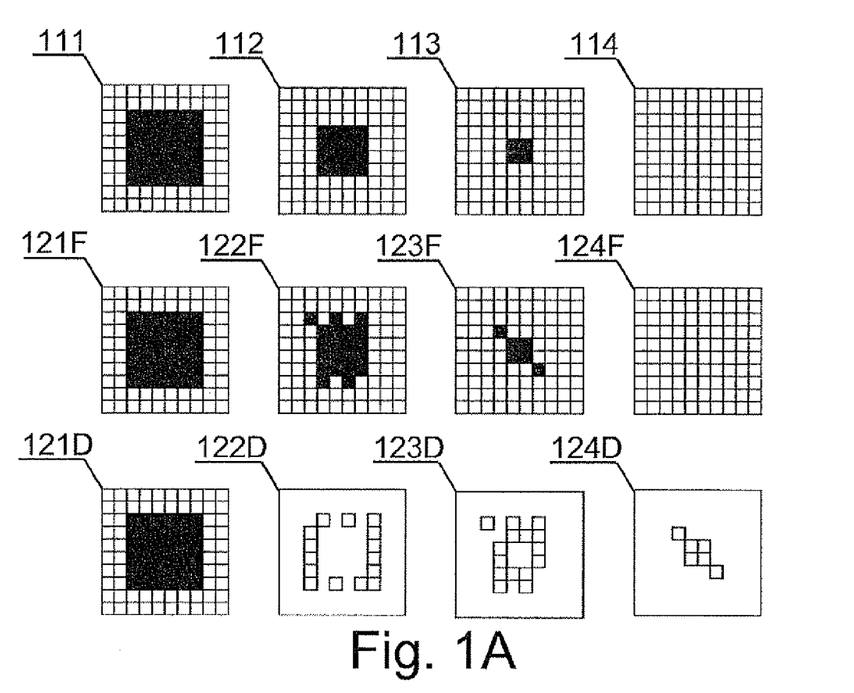
FIG. 1A-1D present exemplary frames of a digital video source signal and an encoded signal according to the invention, generally visualizing the concepts of a pixels maximum threshold amount, selection of pixels whose values undergo the highest amount of change, selection of pixels by macroblocks and selection of pixels by other type of screen regions, respectively.

FIG. 1A presents exemplary frames of a digital video source signal 111-114 and frames of an encoded signal which may comprise encoded full frames 121F-124F and/or encoded difference frames 121D-124D according to the invention, aimed at visualizing principles of the concept of a pixels maximum threshold amount. For clarity, the signals shown in FIG. 1A comprise relatively small frames, 10×10 pixels. However, the concept can be extended to signals with larger frames, such as 720×576 pixels (ITU-R 601 PAL format) or 1920×1080 pixels (Full HD resolution, as defined by ITU-R BT.709). The encoded signal according to the invention comprises a sequence of frames, which can be encoded full frames 121F-124F or encoded difference frames 121D-124D, wherein each frame in the sequence defines pixels changed with respect to the previous frame in the sequence, wherein the number of pixels changed is not higher than a predetermined pixels maximum threshold amount. The difference frames 121D-124D define changed pixels only, i.e. they do not define unchanged pixels, and may comprise additional data, such as a frame header etc. In other words, difference frames relate to or depend on data in the preceding frame, similarly as P frames according to MPEG video standards. The full frames 121F-124F define changed pixels and unchanged pixels, similarly as I frames according to MPEG video standards. For example a full frame is a compressed version of a single uncompressed (raw) frame. The full frames may comprise, for example in a frame header, a list identifying changed pixels. Furthermore, the full frames and the difference frames may comprise, for example in the frame header, information on the amount of changed pixels.

Standard display controllers, such as LCD display controllers, redraw the screen by re-programming the value of consecutive pixels of the screen. Therefore, the time necessary for redrawing the screen is proportional to the number of pixels and increases with the resolution of the screen, such as an LCD matrix. By re-designing the display controller to re-program the value of not all, but only specific pixels of the screen, the frame redraw time may be decreased substantially, proportionally to the decrease in the number of pixels to be redrawn. In the example of FIG. 1A, the pixels maximum threshold amount is set at 15% or 15 pixels. For such configuration, the screen could be redrawn in about 15% of the time required for redrawing the whole screen. Therefore, a typical 5 ms frame redraw time could be reduced to about 0.75 ms, resulting in increase of frame display time by 4.25 ms, which for a rate of 60 frames per second increases the active viewing coefficient from 11.7 ms/2*16.7 ms=35% to 15.95 ms/2*16.7 ms=48%. Such high coefficient increase is possible for a low pixels maximum threshold amount, which is applicable in case of signals involving relatively small changes. In case of quickly changing signals, in order to avoid unacceptable differences between the encoded frames and the source frames, the pixels maximum threshold amount should be higher, for example 50%, which yields the active viewing coefficient of 14.2 ms/2*16.7 ms=43%, which is still significantly higher than the original value of 35%.

Each encoded frame 121D-124D or 121-124F is to resemble a corresponding source frame 111-114. In the encoding process, each source frame is encoded with respect to a reference frame, which in the present example is the previously encoded full frame. The frames can be processed in alternate order, i.e. one sequence may comprise alternate left-eye and right-eye frames, for stereoscopic displays accepting a single stream comprising alternate left and right frames. Alternatively, the frames can be processed in eye-specific sequences, i.e. the left-eye frames may be encoded independently of the right-eye frames, for stereoscopic displays accepting independent left and right eye streams. Each source frame is processed such as to differ from the reference frame by a number of pixels which is not higher than the pixels maximum threshold amount.

For clarity, the first encoded full frame 121F and the first encoded difference frame 121D correspond to the first source frame 111. In the example of FIG. 1A, the pixels maximum threshold amount is set at 15% or 15 pixels. Since the difference between the second source frame 112 and its reference frame, which is the first encoded full frame 121F is 20 pixels, which is higher than the pixels maximum threshold amount, the second encoded full frame 122F only partially corresponds to the second source frame 112. In turn, the second encoded difference frame 122D defines the differences between the second encoded full frame 122F and the first encoded full frame 121F, namely 15 pixels to be changed to white color. Similarly, since the difference between the third source frame 113 and its reference frame, which is the second encoded full frame 122F is 17 pixels, which is higher than the pixels maximum threshold amount, the third encoded full frame 123F only partially corresponds to the third source frame 113. The third encoded difference frame 123D defines the differences between the third encoded full frame 123F and the second encoded full frame 122F, namely 15 pixels to be changed to white color. However, since the difference between the fourth source frame 114 and its reference frame, which is the third encoded full frame 123F is 6 pixels, which is lower than the pixels maximum threshold amount, the fourth encoded full frame 124 corresponds exactly to the fourth source frame 114. The fourth encoded difference frame 124D defines the differences between the fourth encoded full frame 124D and the third encoded full frame 123F, namely 6 pixels to be changed to white color. Therefore, in case the frame to be encoded differs from its previous frame by an amount of pixels higher than the pixels maximum threshold amount, not all pixels of the frame have to be changed. The pixels to be changed may be selected according to various algorithms, described below.

Figure 1B:
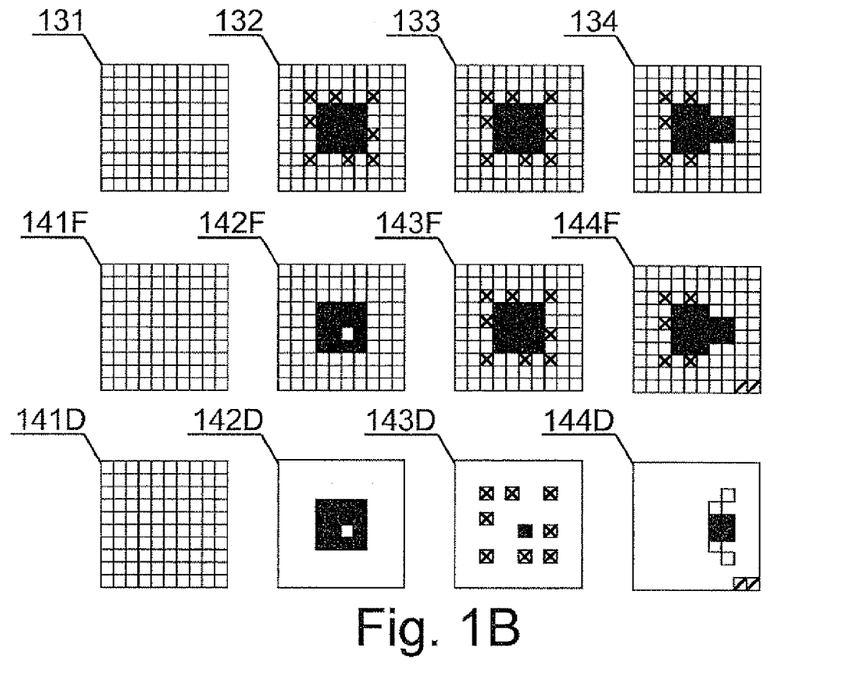

FIG. 1B presents exemplary frames of a digital video source signal 131-134 and frames of an encoded signal which may comprise encoded full frames 141F-144F and/or encoded difference frames 141D-144D according to the invention, aimed to visualize generally the concept of selection of pixels whose values undergo the highest amount of change and the concept of a minimum pixels threshold amount. The method involves comparing the source frame with the reference frame to obtain information on change of values of pixels and changing the values of pixels of the source frame to the values of pixels of the reference frame for pixels whose values undergo the highest amount of change. In the example of FIG. 1B, the pixels maximum threshold amount is set at 15% or 15 pixels. For clarity, the first encoded full frame 141F and the first encoded difference frame 141D are set to correspond to the first source frame 131. The second source frame 132 comprises 16 black pixels and 8 grey pixels. The grey pixels are indicated by letters "x". In such a case, the pixels to be changed are selected from the 16 black pixels only and the 8 grey pixels are discarded in the second encoded full frame 142F and in the second encoded difference frame 142D. Since the third source frame 133 differs from its reference frame, which is the second encoded full frame 142F, by 1 black pixel and 8 grey pixels, which is a lower amount than the pixels maximum threshold amount, the third encoded full frame 143F and the third encoded difference frame 143D may be encoded such as to exactly resemble the third source frame 133. The encoded digital video signal will at this point reach the content of the source signal. The fourth source frame 134 differs from its reference frame, which is the third encoded full frame 143F, by 8 pixels, which is a lower amount than the pixels maximum threshold amount, therefore the fourth encoded full frame 144F and the fourth encoded difference frame 144D may be encoded such as to exactly resemble the fourth source frame 144 and thus the encoded digital video signal will at this point follow the content of the source signal. Furthermore, the fourth encoded frame 144F, 144D may be processed such as to differ from the reference frame by a number of pixels which is not less than a minimum pixels threshold amount. For example, in case the minimum pixels threshold amount is set at 10%, the fourth encoded frame 144F, 144D may contain two further changed pixels, preferably by a minimum value at the border of the screen, indicated by "/".

Figure 1C:
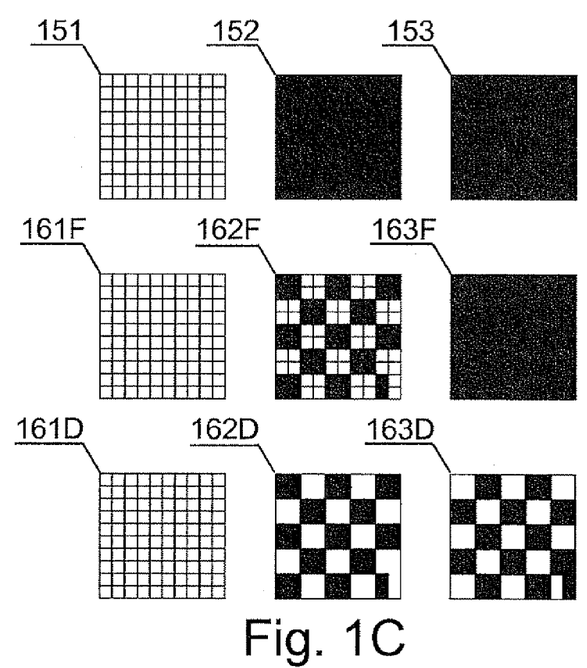

FIG. 1C presents exemplary frames of a digital video source signal 151-153 and frames of an encoded signal which may comprise encoded full frames 161F-163F and/or encoded difference frames 161D-163D according to the invention, aimed to visualize generally the concept of selection of pixels by macroblocks. The method involves comparing the source frame with the reference frame to obtain information on change of values of pixels and changing the values of pixels of the source frame to the values of pixels of the reference frame for pixels belonging to a predetermined one or more frame regions, such as macroblocks. In the example of FIG. 1C, a macroblock is defined as a 2×2 pixel region. In case the number of pixels changed in the first analyzed macroblock does not exceed the pixels maximum threshold amount, all corresponding pixels of the first macroblock may be changed and further macroblocks may be analyzed, until the sum of pixels changed in the whole frame reaches the pixels maximum threshold value. In the example of FIG. 1C, the further macroblock is selected as the macroblock having a number equal to +2. In the example of FIG. 1C, the pixels maximum threshold amount is set at 50% or 50 pixels. Therefore, the first macroblock of the second source frame 152 comprises 4 pixels to be changed with respect to the first encoded frame 161, the third macroblock comprises 4 pixels to be changed, and so on until the 25$^{th}$ macroblock, which comprises 4 pixels to be changed, but since the total amount of pixels already changed equals to 48, then only 2 pixels of the 25$^{th}$ macroblock are selected to be changed. The third source frame 153 comprises macroblocks 1, 3, . . . , 23 which contain no pixels to be changed, a 25$^{th}$ macroblock which contains 2 pixels to be changed with respect to the second encoded frame 162 and macroblocks 2, 4, . . . 24 each containing 4 pixels to be changed. Since the total number of pixels to be changed equals the pixels maximum threshold value, all pixels are changed in the third encoded frame 163.

Figure 1D:
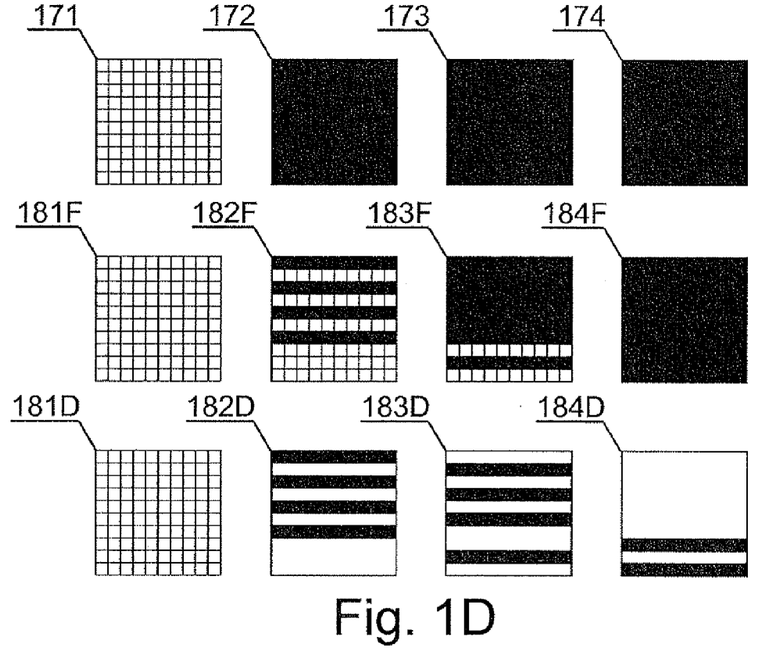

FIG. 1D presents exemplary frames of a digital video source signal 171-173 and an encoded signal 181-183 according to the invention, aimed to visualize generally the concept of selection of pixels by other type of screen regions, such as lines. The procedure is similar to that shown in FIG. 1C, wherein instead of analyzing pixels in each second macroblock, the pixels are analyzed in each second line. In the example of FIG. 1C, the pixels maximum threshold amount is set at 40% or 40 pixels. Therefore, the first line of the second source frame 172 comprises 10 pixels to be changed with respect to the first encoded frame 181, the third line comprises 10 pixels to be changed, and so on until the 7$^{th}$ line, which comprises the last 10 pixels to be changed until the limit of the pixels maximum threshold amount is reached. The third source frame 173 comprises lines 1, 3, 5, 7 which contain no pixels to be changed and lines 2, 4, 6, 8-10 each containing 10 pixels to be changed. Therefore, the 9$^{th}$ line of the third source frame 173 comprises 10 pixels to be changed with respect to the second encoded frame 182, the 2$^{nd}$ line comprises 10 pixels to be changed, and so on until the 6$^{th}$ line, which comprises the last 10 pixels to be changed until the limit of the pixels maximum maximum threshold amount is reached. The fourth source frame 174 comprises lines 1-7, 9 which contain no pixels to be changed and lines 8, 10 each containing 10 pixels to be changed. Since the total number of pixels to be changed is lower than the pixels maximum threshold value, all pixels are changed in the fourth encoded frame 184.

The encoded signal may comprise a sequence of encoded full frames only, which makes it suitable for display by any standard video display unit. Such sequence of frames may be subject to further compression algorithms, preferably lossless compression algorithms so as not to introduce further changes into the content of frames.

Furthermore, the encoded signal may comprise a sequence of difference frames only, which makes it suitable only for video display units capable of decoding such signal, but decreases the bandwidth necessary to transmit the signal. Such encoded signal form may be also used in case the signal encoder is embedded in a video display unit and its output is connected directly to a video display controller handling such format of frames.

Moreover, the encoded signal may comprise a sequence comprising a series of a full frame followed by a plurality of difference frames, such as:

{F,D,D,D,D,F,D,D,D,D,F,D,D,F,D,D,D,D}

Such signal format is suitable only for video display units capable of decoding such signal, but decreases the bandwidth necessary to transmit the signal and may be used for signal transmission over channels susceptible to signal distortion. Even if the signal transmission is interrupted at any point, the contents of the signal will be recovered after reception of the first full frame.

Figure 2:
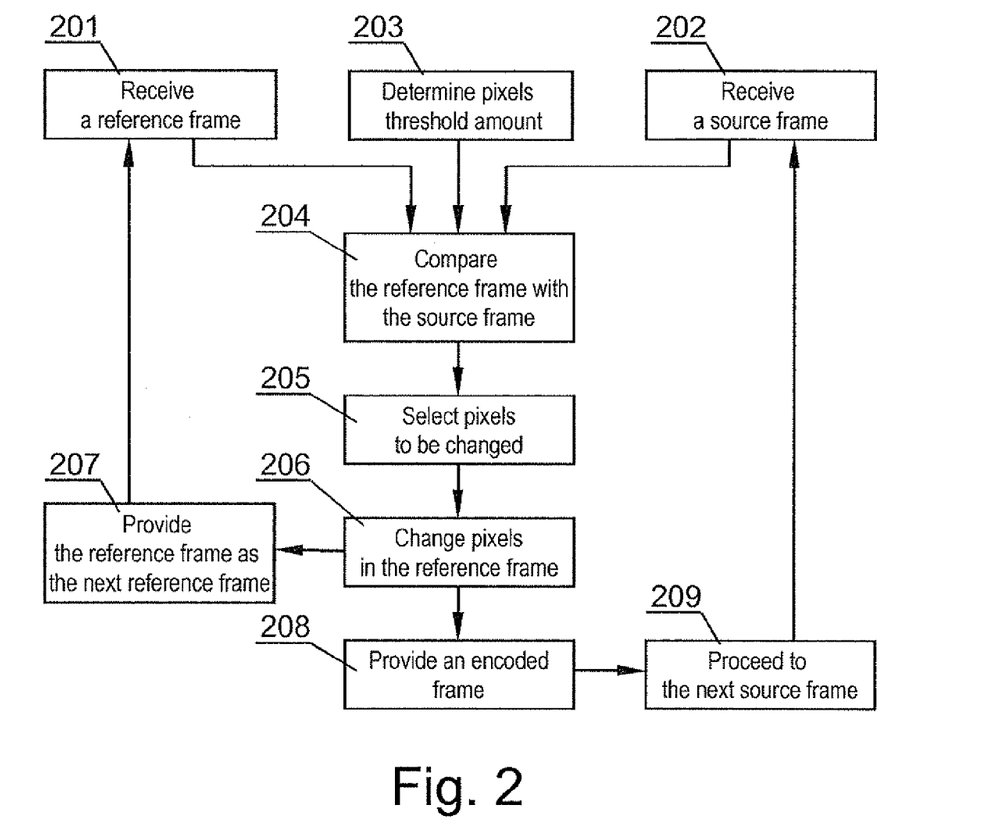
FIG. 2 presents an embodiment of a signal encoding procedure.
Figure 3:
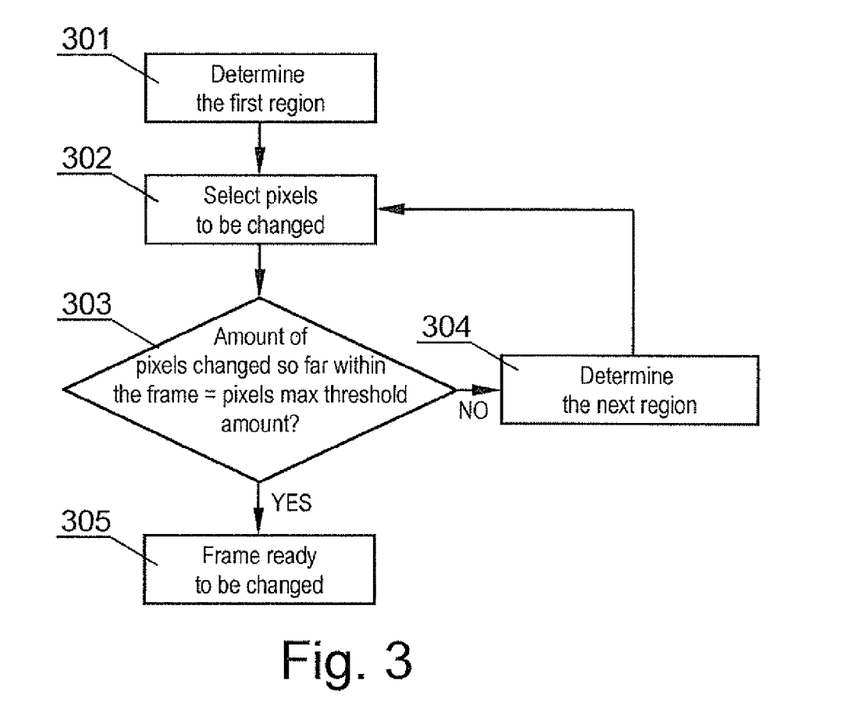
FIG. 3 presents an embodiment of a pixel selection procedure involving analysis of the frame by regions.

FIG. 2 presents an embodiment of a signal encoding procedure. In step 201, a reference frame is received. The reference frame for the first source frame may be a predefined frame, such as a frame comprising all black pixels, or a frame equal to the first source frame. Reference frames for further source frames are generated within the procedure. In step 202 a source frame is received, which is the frame following the previously processed source frame. In step 203 at least a pixels maximum threshold amount is determined, specifying the maximum amount of pixels which may be changed in the currently encoded frame with respect to the reference frame. Furthermore, in step 203 a pixels minimum threshold amount can be determined, specifying the minimum amount of pixels which should be changed in the currently encoded frame with respect to the reference frame. In the following steps, the source frame is encoded with respect to the reference frame to obtain an encoded frame differing from the reference frame by a number of pixels which is not higher than the pixels maximum threshold amount and preferably not lower than the pixels minimum threshold amount. In step 204 the reference frame is compared with the source frame in order to determine the differences of individual pixel values between the source frame and the reference frame. In step 205 the pixels to be changed in the reference frame are selected according to a pixel selection procedure, one embodiment of which is shown in FIG. 3. The pixels to be changed comprise pixels which differ between the reference frame and the source frame, and the number of which is not higher than the pixels maximum threshold amount. In step 206 the values of the selected pixels of the reference frame are changed to the values of corresponding pixels in the source frame. The changed reference frame is provided as a reference frame to the next source frame in step 207. Next, in step 208 an encoded frame is provided, defining pixels changed in the reference frame. The encoded frame may be a full frame, corresponding to the changed reference frame, defining changed pixels and unchanged pixels. Alternatively, the encoded frame may be a difference frame, defining changed pixels only. In step 209 the procedure proceeds to a next source frame.

In case of providing a full frame as the encoded frame, the changed pixels may be additionally indicated within the encoded frame. The indication may be effected by generating an encoded full frame header comprising information on the pixels which differ from the previously encoded full frame. In another embodiment, the indication may be effected by further processing the encoded full frame to embed information on the changed pixels into the values of pixels, for example by changing the lowest bit of source frame pixels such that the changed pixels to be redrawn have an even value and the unchanged pixels have an odd value or vice versa. For example, the value of the pixels G (green) component may be changed, as the component of the lowest visibility.

At the beginning of signal encoding, when no previous frame is available, a plurality of frames may be input at the beginning of the encoded frames sequence in order to provide a smooth transition between a blank screen, i.e. a totally black frame, typically displayed when changing signal sources, and the first frame of the source signal.

In a specific embodiment, the number of pixels selected to be changed in step 205 is equal to the pixels maximum threshold amount, such that each consecutive encoded frames differ by the exact number of pixels. In case the number of selected pixels which differ between the reference frame and the source frame is lower than the pixels maximum threshold amount, further pixels may be selected for change by a minimum value, such that the sum of the number of selected pixels and selected further pixels is equal to the pixels maximum threshold amount. The further pixels to be changed may be selected from the pixels shown at the border of the screen, which are less visible to the viewer. This guarantees a uniform frame redraw time for all frames when the encoded signal is displayed, which facilitates synchronization of the shutter glasses. Such solution is advantageous for standardized systems in which the signal should be sent to the display unit in a standardized form.

In a further specific embodiment, the number of pixels selected to be changed in step 205 is not higher than the pixels maximum threshold amount and not less than the pixels minimum threshold amount. In case the number of selected pixels which differ between the reference frame and the source frame is lower than the pixels maximum threshold amount, further pixels may be selected for change by a minimum value, such that the sum of the number of selected pixels and selected further pixels is not less than the pixels minimum threshold amount. The further pixels to be changed may be selected from the pixels shown at the border of the screen, which are less visible to the viewer. In case the pixels minimum threshold amount is set to a value close to the pixels maximum threshold amount, the frame redraw time for all frames will be similar, therefore the shutter glasses for each frame will be open for a similar amount of time, and so the viewer's eye will receive each frame for a similar duration and therefore have a similar level of brightness perception for each frame.

In case the number of pixels whose values differ between the source frame and the reference frame is higher than the pixels maximum threshold amount, various selection algorithms may be applied. One method of pixels selection may involve selection of pixels whose value differs most between the source frame and the reference frame. For example, pixels which change color from white to black will be selected before the pixels which change color from white to grey, as shown in FIG. 1B. In case a plurality of reference frames are processed, the pixels whose value is constant at the consecutive source frames, i.e. pixels representing intentional changes, may have a priority over the pixels whose value differs between each source frame, i.e. pixels representing noise. Another pixel selection method may comprise analysis of neighboring pixels and changed pixels whose neighboring pixels also undergo change may have a priority over pixels whose neighboring pixels do not undergo any change, which are thus less visible to the viewer. Yet another pixel selection method may involve a priority of pixels in the middle of the screen over the pixels at the border of the screen.

Optionally the encoded signal comprises information defining the maximum threshold identifying the maximum number of changed pixels a frame may comprise. This parameter may be useful when a receiver is to process the received encoded signal and the maximum threshold is to be used as a parameter. In another embodiment the maximum threshold may be adaptively measured, which may require time and analysis which is not necessary in the case of explicit maximum threshold value identification.

FIG. 3 presents an embodiment of a pixel selection procedure, to be performed in step 205, involving analysis of the frame by regions, which is particularly useful in case of changes of large frame regions, which exceed the pixels maximum threshold amount, as shown in FIGS. 1C and 1D. In step 301 the first region to be analyzed is determined. A region may cover a macroblock as shown in FIG. 1C, a line as shown in FIG. 1D or a differently shaped portion of the frame. In step 302 the pixels to be changed are selected within the currently active region, keeping in mind the maximum allowed pixels maximum threshold amount. In case in step 303 it is determined that the amount of pixels changed so far within the frame does not exceed the pixels maximum threshold amount, the next region is determined in step 304. The next region may be the region nearest to the currently processed region, a region spaced apart by one or more regions (e.g. spaced apart by 1 region as shown in FIGS. 1C and 1D) or a randomly-selected region. Furthermore, the regions for selection may be sorted according to the amount of pixels changed within each region, so that the values of pixels are changed first in the regions in which most change occurs, which is particularly preferable in case of generating signals for display units which have a matrix in which a whole region is redrawn at a time rather than single pixels. In case the maximum allowed number of pixels to be changed, i.e. the pixels maximum threshold amount, is reached, the frame is declared as ready to be changed in step 305.

Figure 4:
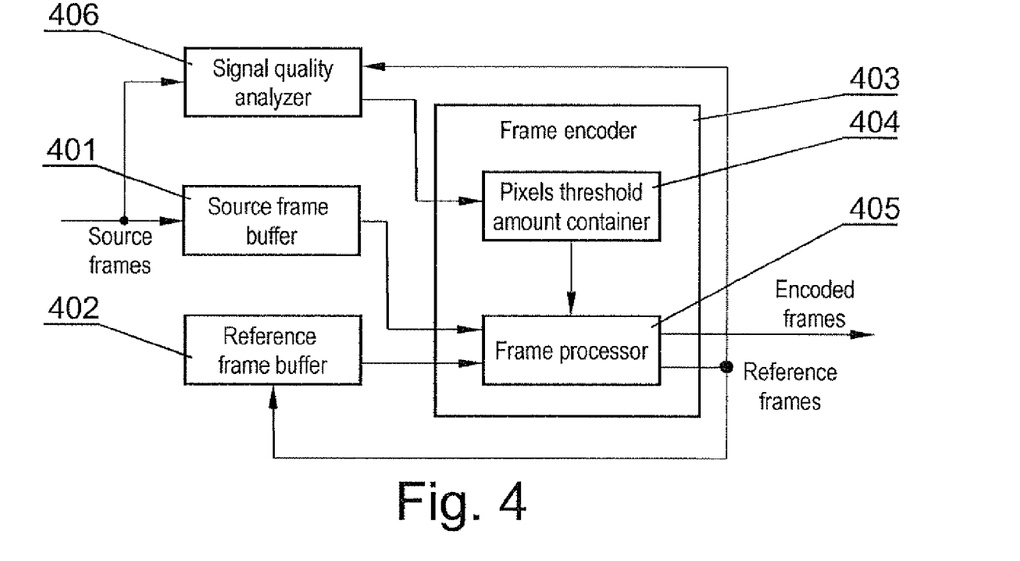
FIG. 4 presents an embodiment of a digital video signal encoder.

FIG. 4 presents an embodiment of a digital video signal encoder. The encoder may be embedded in a video display unit, such as an LCD display, to receive the source video signal and provide an encoded signal to the display controller. The encoder may be also external to the video display unit, for example it may be embedded in a PC computer, a video disc player or a digital television set-top box and provide a signal to the video display unit. The encoder comprises a source frame buffer 401 configured to receive a source frame of the source video signal, a reference frame buffer 402 configured to receive a reference frame and a frame encoder 403 coupled to the reference frame buffer and to the source frame buffer and configured to encode the source frame with respect to the reference frame to provide an encoded frame, according to the coding method presented in FIG. 2. In particular, the frame encoder may be configured to compare the reference frame with the source frame and select a number of pixels from the pixels which differ between the reference frame and the source frame, the number of selected pixels being not higher than the pixels maximum threshold amount, change the values of the selected pixels of the reference frame to the values of corresponding pixels of the source frame to provide a reference frame for the next source frame and store the reference frame in the reference frame buffer 402 and provide an encoded frame defining pixels changed in the reference frame. As indicated above, the encoded frames may be full frames, equivalent to the reference frames, or difference frames. The frame encoder 403 comprises a pixels threshold amount container 404, configured to store the pixels maximum threshold amount and preferably the pixels minimum threshold amount. The value of the maximum and minimum threshold may be preset for a given type of the video display, or set by an external entity. For example, the maximum threshold may be set by the shutter glasses controller to adjust the system to a particular type of shutter glasses. Alternatively, the maximum threshold may be set by a signal quality analyzer 406 configured to analyze the source video signal and adjust the value of the maximum threshold depending on the source signal contents, for example set a higher value of the coefficient for signals with high amount of change between frames and a lower value of the coefficient for signals with low amount of change between frames. The signal quality analyzer 406 may be further configured to self-calibrate by comparing the amount of differences between the encoded frames and the source frames and increase the maximum threshold value in case of increase in the amount of differences. The frame encoder 403 further comprises a frame processor 405 configured to process the source frame to generate the encoded frame differing from the reference frame by a number of pixels which is not higher than the pixels maximum threshold amount. The frame processor may be controlled by software performing the methods presented in FIG. 2 and FIG. 3. Each encoded frame may be output to the display and input to the reference frame buffer 402 to serve as a reference frame for the following source frame to be encoded.

It can be easily recognised, by one skilled in the art, that the aforementioned method for encoding of a digital video signal may be performed and/or controlled by one or more computer programs. Such computer programs are typically executed by utilizing the computing resources in a computing device such as personal computers, personal digital assistants, cellular telephones, receivers and decoders of digital television or the like. Applications are stored in non-volatile memory, for example a flash memory or volatile memory, for example RAM and are executed by a processor. The encoder, according to the present invention, optionally comprises such a memory. These memories are exemplary recording media for storing computer programs comprising computer-executable instructions performing all the steps of the computer-implemented method according the technical concept presented herein.

The present invention may be implemented using any display, for example on a computer monitor, a television display, a mobile phone, PDA, or a laptop computer.

While the invention presented herein has been depicted, described, and has been defined with reference to particular preferred embodiments, such references and examples of implementation in the foregoing specification do not imply any limitation on the invention. It will, however, be evident that various modifications and changes may be made thereto without departing from the broader scope of the technical concept. The presented preferred embodiments are exemplary only, and are not exhaustive of the scope of the technical concept presented herein. Accordingly, the scope of protection is not limited to the preferred embodiments described in the specification, but is only limited by the claims that follow.

The invention claimed is:

1. A method for encoding of a stereoscopic digital source video signal comprising alternate left-eye and right-eye frames, the method comprising the steps of:
   receiving a reference frame;
   receiving a source frame of the source video signal;
   determining a value defining a pixels maximum threshold amount which is lower than the number of pixels in one frame;
   comparing the reference frame with the source frame to determine the pixels which differ between the reference frame and the source frame,
   generating an encoded frame based on the differences between the source frame and the reference frame comprising:
      selecting, on a frame-by-frame basis, a first group of pixels comprising only a number of pixels selected from the pixels which differ between the reference frame and the source frame, the number of selected pixels being not higher than the pixels maximum threshold amount and only in case the number of selected pixels of the first group of pixels is lower than the pixels maximum threshold amount, selecting a second group of pixels comprising further pixels selected from the pixels which do not differ between the reference frame and the source frame, such that the sum of the number of selected pixels of the first group and selected further pixels of the second group is equal to the pixels maximum threshold amount or not less than a predetermined pixels minimum threshold amount,
      changing the values of the selected pixels of the reference frame to the values of corresponding pixels of the source frame to provide a reference frame for the next source frame; and,
      providing an encoded frame defining pixels changed in the reference frame.

2. The method according to claim 1, wherein the further pixels are selected from the pixels at the border of the screen.

3. The method according to of claim 1, wherein the selected pixels are the pixels whose value differs most between the source frame and the reference frame.

4. The method according to claim 1, wherein the selected pixels are pixels belonging to a predetermined one or more frame regions.

5. The method according to claim 1, further comprising the steps of receiving at least one further source frame, comparing the reference frame with the source frame and the at least one further source frame and selecting a number of pixels from the pixels which differ between the reference frame and the source frame and/or the at least one further source frame.

6. A non-transitory tangible computer readable medium for storing computer-executable instructions for performing a method for encoding of a stereoscopic digital source video signal comprising alternate left-eye and right-eye frames, the method comprising the steps of:
   receiving a reference frame;
   receiving a source frame of the source video signal;
   determining a value defining a pixels maximum threshold amount which is lower than the number of pixels in one frame;
   comparing the reference frame with the source frame to determine the pixels which differ between the reference frame and the source frame,
   generating an encoded frame based on the differences between the source frame and the reference frame comprising:
      selecting, on a frame-by-frame basis, a first group of pixels comprising only a number of pixels selected from the pixels which differ between the reference frame and the source frame, the number of selected pixels being not higher than the pixels maximum threshold amount and only in case the number of selected pixels of the first group of pixels is lower than the pixels maximum threshold amount, selecting a second group of pixels comprising further pixels selected from the pixels which do not differ between the reference frame and the source frame, such that the sum of the number of selected pixels of the first group and selected further pixels of the second group is equal to the pixels maximum threshold amount or not less than a predetermined pixels minimum threshold amount;
      changing the values of the selected pixels of the reference frame to the values of corresponding pixels of the source frame to provide a reference frame for the next source frame; and,
   providing an encoded frame defining pixels changed in the reference frame.

7. A digital video signal encoder for a stereoscopic digital source video signal comprising alternate left-eye and right-eye frames comprising:
   a reference frame buffer (402) configured to receive a reference frame;
   a source frame buffer (401) configured to receive a source frame of a source video signal;
   a pixels maximum threshold amount container (404) configured to store a value defining the pixels maximum threshold amount which is lower than the number of pixels in one frame;

a frame encoder (403) configured to generate an encoded frame based on the differences between the source frame and the reference frame comprising:

a frame processor (405) coupled to the pixels maximum threshold amount container (404) and configured to:

receive a reference frame from the reference frame buffer (402);

receive a source frame from the source frame buffer (401);

compare the reference frame with the source frame to determine the pixels which differ between the reference frame and the source frame;

select, on a frame-by-frame basis, a first group of pixels comprising only a number of pixels selected from the pixels which differ between the reference frame and the source frame, the number of selected pixels being not higher than the pixels maximum threshold amount and only in case the number of selected pixels of the first group of pixels is lower than the pixels maximum threshold amount, selecting a second group of pixels comprising further pixels selected from the pixels which do not differ between the reference frame and the source frame, such that the sum of the number of selected pixels of the first group and selected further pixels of the second group is equal to the pixels maximum threshold amount or not less than a predetermined pixels minimum threshold amount;

change the values of the selected pixels of the reference frame to the values of corresponding pixels of the source frame to provide a reference frame for the next source frame and store the reference frame in the reference frame buffer (402); and, provide an encoded frame defining pixels changed in the reference frame.

8. The digital video signal encoder according to claim 7 further comprising a signal quality analyzer (406) configured to receive source frames from the source frame buffer (401) and to determine the value defining the pixels maximum threshold amount depending on the source signal contents and to set the determined value at the pixels maximum threshold amount container (404).

9. The digital video signal encoder according to claim 8 further comprising a signal quality analyzer configured to receive source frames from the source frame buffer (401) and to receive reference frames from the reference frame buffer (402) and to determine the value defining the pixels maximum threshold amount depending on the amount of differences between the encoded frames and the source frames and to set the determined value at the pixels maximum threshold amount container (404).

10. A video display unit comprising the digital video signal encoder according to claim 8.

* * * * *